United States Patent
Kang

(10) Patent No.: US 7,142,654 B2
(45) Date of Patent: Nov. 28, 2006

(54) METHOD FOR HIGH-SPEED REGISTRATION OF SUBSCRIBERS IN A NETWORK MANAGEMENT SYSTEM BY UTILIZING PROFILE PROVISION

(75) Inventor: Young-Hyun Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 788 days.

(21) Appl. No.: 10/303,904

(22) Filed: Nov. 26, 2002

(65) Prior Publication Data

US 2003/0108168 A1    Jun. 12, 2003

(30) Foreign Application Priority Data

Dec. 6, 2001    (KR) .............................. 2001-76935

(51) Int. Cl.
*H04M 3/42* (2006.01)
*H04M 15/24* (2006.01)

(52) U.S. Cl. ................ 379/201.02; 379/26.01
(58) Field of Classification Search ............ 379/26.01, 379/26.02, 27.01, 27.02, 27.03, 27.04, 27.08, 379/201.02

See application file for complete search history.

(56) References Cited

U.S. PATENT DOCUMENTS

| | | | |
|---|---|---|---|
| 5,592,533 A | 1/1997 | McHenry et al. | |
| 5,657,451 A | 8/1997 | Khello | |
| 5,913,218 A | 6/1999 | Carney et al. | |
| H1918 H | 11/2000 | Hoffpaior et al. | |
| 6,215,855 B1* | 4/2001 | Schneider | 379/22 |
| 6,385,203 B1* | 5/2002 | McHale et al. | 370/401 |
| 6,636,505 B1* | 10/2003 | Wang et al. | 370/352 |
| 6,873,628 B1* | 3/2005 | Tang | 370/480 |
| 2002/0048348 A1* | 4/2002 | Jin et al. | 379/29.01 |
| 2002/0085508 A1* | 7/2002 | Suonsivu et al. | 370/256 |
| 2002/0168054 A1* | 11/2002 | Klos et al. | 379/1.04 |

* cited by examiner

*Primary Examiner*—Bing Q. Bui
(74) *Attorney, Agent, or Firm*—Robert E. Bushnell, Esq.

(57) ABSTRACT

Disclosed is a method for processing port provisions for IDLC or xDSL subscribers provided at network elements in a network management system. In the method for high-speed registration of subscribers in a network management system by utilizing profile provision, provisions are processed by a batch job, an example set is set up and constructed as a profile including the same unit/port information through the batch job, and the ES is automatically copied from the memory when the corresponding information, so that a plurality of subscribers can be set up without burden of traffic by one-time transfer of information.

10 Claims, 2 Drawing Sheets

METHOD FOR HIGH-SPEED REGISTRATION OF SUBSCRIBERS IN A NETWORK MANAGEMENT SYSTEM BY UTILIZING PROFILE PROVISION

CLAIM OF PRIORITY

This application claims priority under 35 U.S.C. § 119 to my application entitled "Method for high-speed registration of subscribers in a network management system by utilizing profile provision" filed in the Korean Industrial Property Office on Dec. 6, 2001 and assigned Serial No. 2001-76935, the contents of which are hereby incorporated by reference.

BACKGROUND OF THE INVENTION

1. Field of the Invention

The present invention relates to a method for processing port provisions for IDLC or xDSL subscribers provided at network elements in a network management system, and more particularly to a method for high-speed registration of subscribers in a network management system by utilizing profile provision, in which provisions are processed by a batch job, an example set (ES) is established and constructed as a profile including the same unit/port information through a batch job, and the ES is automatically copied from the memory when corresponding information is transferred to a network element (NE), so that a plurality of subscribers can be set up without the burden of traffic by one-time transfer of information.

2. Description of the Related Art

In general, a network management system (NMS) is a system including a series of elements, which copes with disruption of or deterioration of performance of a network, so as to maximize the efficiency of the network, and enables the network to operate stably, thereby providing an uninterrupted service for users of the network. The network management system collects and analyzes real time status, trouble, construction, statistical data, etc., reported from network elements (NEs) constituting a network, instantly reports abnormal status of any NE to an operator of the network, copes with the abnormal status, and provides the operator with information required in analyzing a current state of the network or establishing a future scheme for the network, based on the collected data. Further, the NEs correspond to various equipment or assemblies of equipment, intelligent transmitting systems or exchanger systems, which constitute the network. The network management system synthetically controls network elements which are different according to equipment, areas, and characteristics, thereby constructing a consistent system of managing, maintaining, and repairing the network. Especially, the network management system analyzes circuits in a traffic bottleneck state, thereby supporting an establishment of the best network design. Of course, the operator does not input the commands through the craft interface terminal (CIT) but must input the commands by means of a mouse or keyboard in a window environment. However, the operator cannot avoid the set-up labor at all.

SUMMARY OF THE INVENTION

It is therefore an object of the present invention to provide a novel method for registering subscribers in a network management system that greatly reduces the labor burden of an operator.

It is also an object of the present invention to provide a novel method for registering subscribers in a network management system that reduces the number of communications between the network management system and the network elements.

It is further an object of the present invention to provide a novel method for registering subscribers in a network management system that is quick and easy.

It is yet another abject of the present invention to provide a novel method for registering subscribers in a network management system that minimizes the burden of protocol stacks.

It is still yet another object of the present invention to provide a novel method for registering subscribers in a network management system that is convenient for an operator.

These and other objects can be achieved by a novel method for registering subscribers in a network management system by utilizing profile provision. In this novel method, a case requiring the largest quantity of labor is selected from among subscribers for each port in each unit, and is set as an example set (ES). Then, a profile including information about a rack, shelf, unit, and port, is made corresponding to the port for which the ES is set up, and the profile is transmitted to the NE. The NE reads the profile and analyzes locative information which will be set up, and then simultaneously sets up all ports, units, shelves, and racks, which are necessary in subscribers' connection. After the NE completes the set-up, the NE transmits a trap signal, which reflects the result of the set-up, to the network management system, and the network management system automatically refers to and analyzes the set-up information. Therefore, the operator of the network management system can avoid repetitive inputting labor by utilizing this method, thereby minimizing the load on the communication path. Also, the network management system can provide reliability for the set up labor by automatically referring to and analyzing the set-up information.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
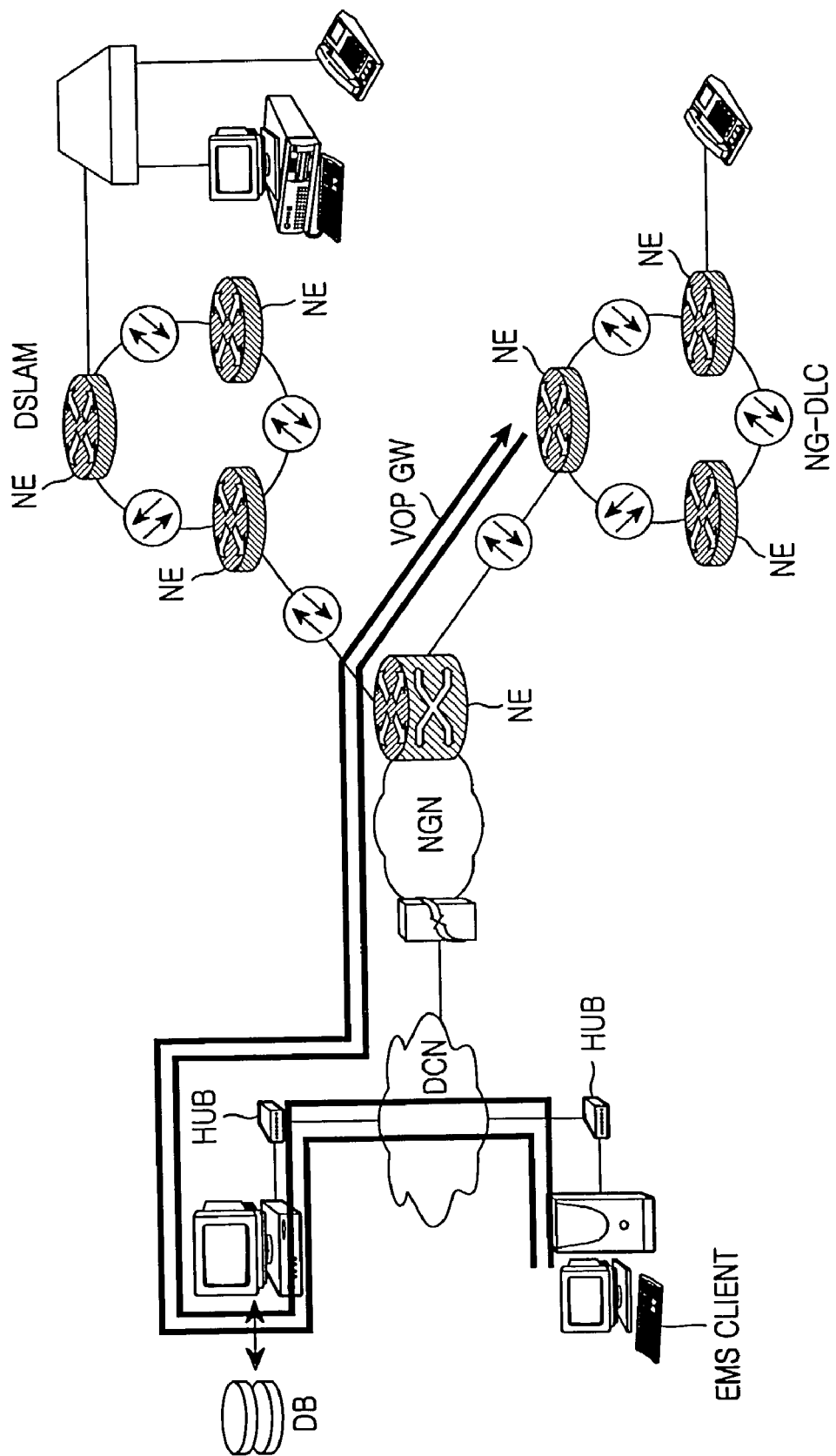
FIG. 1 is a diagram illustrating the construction of a network management system.

Turning to the figures, FIG. 1 illustrates a general network management system. In this invention, it is desired to register each of the network elements (NE's) with the element management system (EMS) using an example set (ES). However, although the ES, in which subscribers are set up for each port in each unit, can reduce the operator's mistakes in the set up and shorten the operator's working time, there still remains a problem in that the subscribers must be set up for each port. In this case, another problem which makes the operation toilsome for the operator is that, when the ES is installed, the labor of connecting subscribers must be done for hundred subscribers for each telephone office. Therefore, in an actual situation such as this, the operator is apt to make mistakes in the course of the set-up labor, and it takes much time to confirm the connection and open the communication.

In order to set Digital Subscriber Line (xDSL) or Integrated Digital Loop Carrier (IDLC) subscribers provided at the NE, an element management system (EMS) as shown in FIG. 1 should transmit seven or eight commands to the NE. In FIG. 1, DCN, DB, and NGN which are not described above mean Data Communication Network, Database, and Next Generation Network, respectively. The following Table 1 illustrates an example of a command set and parameters transmitted as described above:

TABLE 1

An IDLC setup command set and parameters for setting one subscriber
PRV-VARIANT:PID:VID = n [,V51D = m];
PRV-VARIANT:PID:LINKID = n, LINK = {PRI | SEC | NOR | DEL};
PRV-VARIANT:PID:LOGC = n, CPATH = [PSTN] [,CONTROL]
[,LINKC] [,BCC] [,ISDND] [,ISDNF] [,ISDNP],
TYPE = {ADD | DEL};
PRV-VARIANT:PID:TS = {15 | 16 | 31}
[,LOGC = n] [,MODE = {STANBY | BEARER};
PRV-VARIANT:PID:VID = n, TYPE = {DEL | END | REM };
PRV-VARIANT:PID:SRCVID = n, DSTVID = n; RTRV-VARIANT;
PID:VID = n;

In FIG. 1, DSLAM means a Digital Subscriber Line Access Multiplexer, and DLC means a Digital Loop Carrier. The element management system (EMS) shown in FIG. 1 sends the commands described above one by one. In this case, the EMS sends the next command after receiving an executed result for each command. Therefore, the operator must input exact parameters for each command, and must send the next command after confirming whether the inputted command has been executed exactly. As shown in Table 1 described above, only after one set of the commands as described above is executed, connection of one subscriber is completed. For example, when one rack includes four shelves, one shelf includes sixteen units, and one unit includes 32 ports, the operator must input 2,048 parameters (1×4×16×32=2,048) for each rack. Moreover, when the operator inputs even the command language, the burden on the operator grows heavier. In other words, the operator of the EMS must undertake such a heavy labor of setting up these complicated parameters and construction environments one by one.

Figure 2:
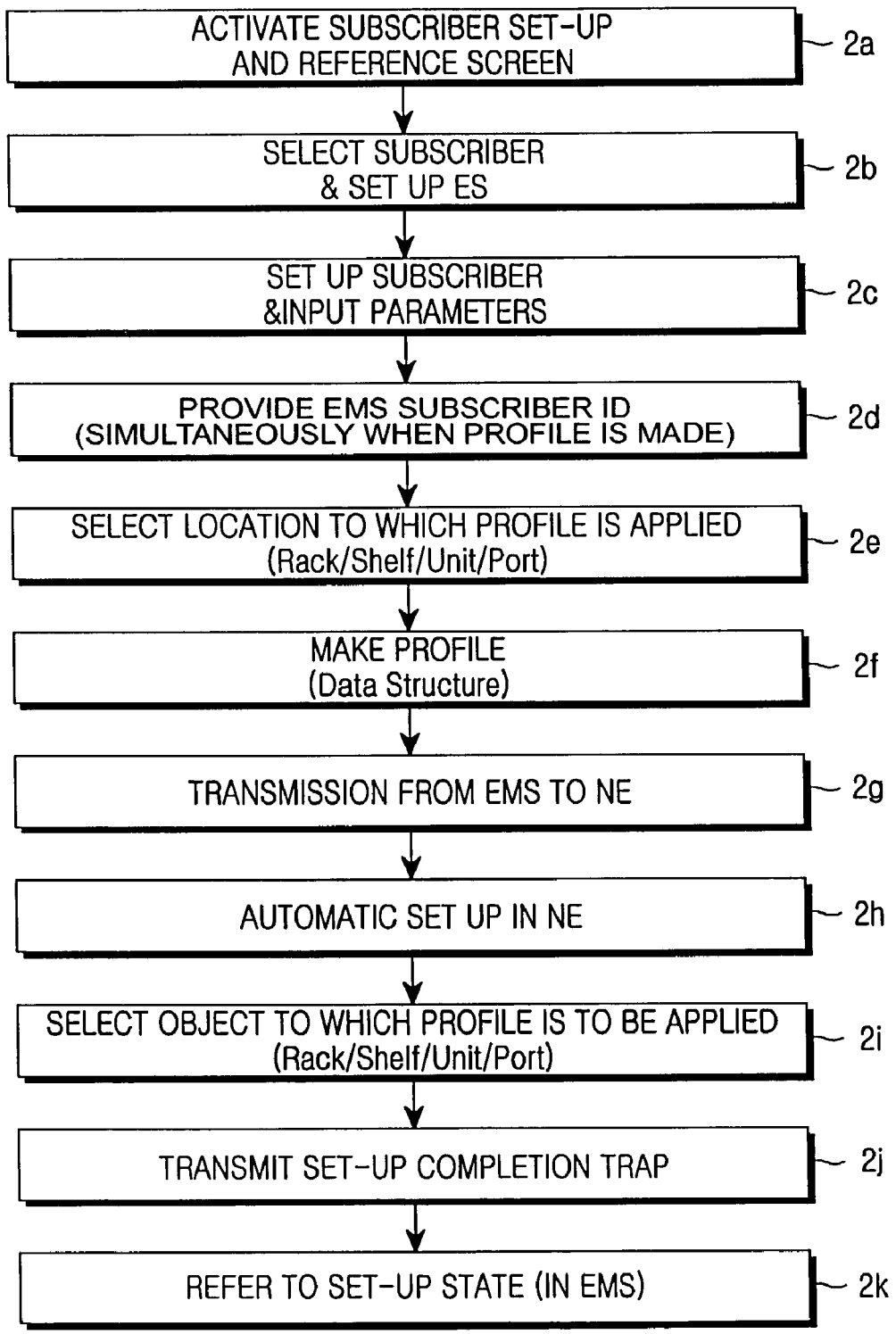
FIG. 2 is a flowchart illustrating a method for high-speed registration of subscribers in a network management system by utilizing profile provision, according to the principles of the present invention.

FIG. 2 is as flowchart illustrating the novel method for registering the NE's with an EMS IS using an ES. Because one ES accomplishes many commands required by the operator, it can be installed easily and quickly. The ES can replace the repetitive operator's labor and work load on the operation by making the ES by collecting various commands per operation case, then filing and setting the ES according to the port, unit, shelf and rack and analyzing the settled information setting up all ports or units shelves and racks which are necessary in subscribers' connection at once. Referring to FIG. 2, the method can be broken down into 5 parts. The first part is activating a subscriber set-up and reference screen and referring to a current state for setting up the subscribers (step 2a). The second part is inputting an ID for a V5 interface, setting up a subscriber, selecting an example set (ES) (step 2c), inputting parameters, and providing an EMS subscriber ID, when the present state shows no problem in preparation for the set up according to a result from the reference in the first part (step 2d). The third part is setting a rack, shelf, unit, and port according to the ES selected in the second part, and creating a profile by utilizing the rack, shelf, unit, and port (steps 2e and 2f). The fourth part is transmitting the profile created in the third part from an element management system (EMS) to the NE, reading from locative information an object to which a file transfer protocol (FTP) is to be transmitted, thereby automatically selecting a file in the NE, and then confirming parameters for the rack, shelf, unit, and port, thereby completing the set up (step 2g). The last part is transmitting a set-up completion trap from the NE to the EMS, and referring to the set-up state in the EMS, when the set-up has been completed in the fourth part (steps 2j and 2k).

In step 2a in FIG. 2, in order to make a subscriber provision, the operator in the EMS as shown in FIG. 1 activates a "subscriber set-up and reference" screen which has been made by Graphical User Interface (GUI), refers to a current set-up state, and inputs an ID for a V5 interface. Further, in step 2b, the operator sets up an example set (ES) for selection of a subscriber as shown in table 2 illustrated below. An ES is a set of various commands necessary for operating for each case. The ES set up makes a set of the commands according to the operation. The ES is automatically set up. Currently, there are arranged 22 cases of example sets (ESs) as illustrated below, which may be set up by the operator. In this case, sets 0 to 49 are sectors basically defined, and sets 50 to 59 are sectors to be defined by the operator. Table 2 below illustrates a simple illustration of an Example Set (ES):

TABLE 2

VIDSET [0] . portFill [1] = True;
VIDSET [0] . port [1] . lid = 0;
VIDSET [0] . port [1] . link = 1;
VIDSET [0] . port [1] . tsFill [15] = True;
VIDSET [0] . port [1] . ts [15] . pg = 2;
VIDSET [0] . port [1] . ts [15] . logc = 1;
VIDSET [0] . port [1] . ts [15] . mode = 1;
VIDSET [0] . port [1] . ts [15] . path [1] = 1;
Strcpy(VIDSET [0] . port [1] . ts [15] . cpath, "PSTN");
VIDSET [0] . port [1] . tsFill [16] = True;
VIDSET [0] . port [1] . ts [16] . pg = 1;
VIDSET [0] . port [1] . ts [16] . logc = 0;
VIDSET [0] . port [1] . ts [16] . mode = 1;
VIDSET [0] . port [1] . ts [16] . path [2] = 2;
VIDSET [0] . port [1] . ts [16] . path [3] = 3;
VIDSET [0] . port [1] . ts [16] . path [4] = 4;
VIDSET [0] . port [1] . ts [16] . path [8] = 8;
Strcpy(VIDSET [0] . port [1] . ts [16] . cpath,
"CONTROL LINKC BCC PROTECT");
VIDSET [0] . port [1] . tsFill [31] = True;
VIDSET [0] . port [1] . ts [31] . pg = 2;
VIDSET [0] . port [1] . ts [31] . logc = 2;
VIDSET [0] . port [1] . ts [31] . mode = 1;
VIDSET [0] . port [1] . ts [31] . path [5] = 5;
VIDSET [0] . port [1] . ts [31] . path [7] = 7;
Strcpy(VIDSET [0] . port [1] . ts [31] . cpath, "ISDNds ISDNp");
VIDSET [0] . portFill [2] = True;
VIDSET [0] . port [2] . lid = 1;
VIDSET [0] . port [2] . link = 2;
VIDSET [0] . port [2] . tsFill [15] = True;
VIDSET [0] . port [2] . ts [15] . pg = 2;
VIDSET [0] . port [2] . ts [15] . mode = 2;
VIDSET [0] . port [2] . tsFill [16] = True;
VIDSET [0] . port [2] . ts [16] . pg = 1;
VIDSET [0] . port [2] . ts [16] . mode = 2;
VIDSET [0] . port [2] . ts [16] . path [8] = 8;
Strcpy(VIDSET [0] . port [1] . ts [16] . cpath, "PROTECT");
VIDSET [0] . port [2] . tsFill [31] = True;
VIDSET [0] . port [2] . ts [31] . pg = 2;
VIDSET [0] . port [2] . ts [31] . mode = 2;

When an ES has been selected in step 2b, parameters for setting up the subscriber are inputted to the ES selected by the EMS, and an EMS subscriber ID is provided for the subscriber, so that the ID can be automatically provided when the profile is made in step 2b. The selected ES is generally an ES that has a high frequency of use, or alternatively, the most complex ES can be selected for this process. When there is no ES corresponding to the subscriber to be set up, an ES with the greatest similarity is selected and displayed on the screen, and then some items of the selected ES, which need to be amended, are amended. That is, a corrected ES can be used when there is no adequate ES available. Then, when it is desired, the revised ES may be set as a user-defined set which can be utilized as an ES in future cases. In this case, this process can be done as a batch job. In step 2e, a target location to which the profile will be applied is selected according to the racks, shelves, units, and ports. That is, the target location is selected from among the NEs shown in FIG. 1. When the target location has been selected in step 2e, the profile is made in step 2f as shown in table 3 illustrated below. The profile is a form of file having locative information regarding rack, unit, shelf and port information. The ES is included in the profile. In the profile, information about the location of the NE (which includes rack/shelf/unit/port) is further contained and repeatedly utilized. In this case, 16 sets, each of which corresponds to each port, may constitute one file.

TABLE 3

A simple illustration of Example Set

VIDSET [0] . portFill [1] = True;
VIDSET [0] . port [1] . lid = 0;
VIDSET [0] . port [1] . link = 1;
VIDSET [0] . port [1] . tsFill [15] = True;
VIDSET [0] . port [1] . ts [15] . pg = 2;
VIDSET [0] . port [1] . ts [15] . logc = 1;
VIDSET [0] . port [1] . ts [15] . mode = 1;
VIDSET [0] . port [1] . ts [15] . path [1] = 1;
Strcpy(VIDSET [0] . port [1] . ts [15] . cpath, "PSTN");
VIDSET [0] . port [1] . tsFill [16] = True;
VIDSET [0] . port [1] . ts [16] . pg = 1;
VIDSET [0] . port [1] . ts [16] . logc = 0;
VIDSET [0] . port [1] . ts [16] . mode = 1;
VIDSET [0] . port [1] . ts [16] . path [2] = 2;
VIDSET [0] . port [1] . ts [16] . path [3] = 3;
VIDSET [0] . port [1] . ts [16] . path [4] = 4;
VIDSET [0] . port [1] . ts [16] . path [8] = 8;
Strcpy(VIDSET [0] . port [1] . ts [16] . cpath, "CONTROL LINKC BCC PROTECT");
VIDSET [0] . port [1] . tsFill [31] = True;
VIDSET [0] . port [1] . ts [31] . pg = 2;
VIDSET [0] . port [1] . ts [31] . logc = 2;
VIDSET [0] . port [1] . ts [31] . mode = 1;
VIDSET [0] . port [1] . ts [31] . path [5] = 5;
VIDSET [0] . port [1] . ts [31] . path [7] = 7;
Strcpy(VIDSET [1] . port [1] . ts [31 ] . cpath, "ISDNds ISDNp");
VIDSET [0] . portFill [2], = True;
VIDSET [0] . port [2] . lid = 1;
VIDSET [0] . port [2] . link = 2;
VIDSET [0] . port [2] . tsFill [15] = True;
VIDSET [0] . port [2] . ts [15] . pg = 2;
VIDSET [0] . port [2] . ts [15] . mode = 2;
VIDSET [0] . port [2] . tsFill [16] . True;
VIDSET [0] . port [2] . ts [16] . pg = 1;
VIDSET [0] . port [2] . ts [16] . mode = 2;
VIDSET [0] . port [2] . ts [16] . path [8] = 8;
Strcpy(VIDSET [0] . port [1] . ts [16] . cpath, "PROTECT");
VIDSET [0] . port [2] . tsFill [31] = True;
VIDSET [0] . port [2] . ts [31] . pg = 2;
VIDSET [0] . port [2] . ts [31] . mode = 2;
Addition of locative information field When the EMS transmits the profile made in step 2f to the NE by utilizing a file transfer protocol (FTP) in step 2g, an agent for the NE goes into a software (S/W) [S/W] module for analyzing the profile and does the set-up labor in step 2h. The software is for a subscriber setting corresponding to GR303 (IDLC) of U.S. Communication Advice. In this case, the set-up labor is automatically carried out according to the object to which the profile is applied and according to the rack, shelf, unit, and port. When the set-up has been completed, the NE transmits a trap according to the completion of the set-up to the EMS in step 2j, and the EMS refers to the set-up state, thereby examining whether or not there is an abnormality. That is, in steps from 2g to 2k, an object to which an FTP is to be transmitted is read from the locative information and a file is automatically set up, and set-up parameters are confirmed when the set-up has been totally completed. Next, the EMS transmits command languages to the NE according to a sequence defined in the ES, and execution of the command languages is confirmed step by step by a progress bar. In this case, while the labor according to the transmission is carried out, the network management system can execute other functions. When all labors have been completed in the NE, the NE transmits a completion trap to the EMS, thereby ending the process.

As described above, in the method according to the present invention, a batch job by the ES prevents an operator of the network management system from making a mistake, and all parameters for subscriber ports can be set up by one click. Therefore, the method according to the present invention minimizes possible problems in the communication between the network management system and the network elements through local area network (LAN). Also, the method can remarkably reduce the number of communications, thereby minimizing the burden of protocol stacks. In the method, all labor can be completed through a one-time confirmation of the result, and the provision can be set up not through communication but by an inner processor, so that the set-up can be done remarkably quickly in real time and quickly in proportion to the number of subscribers. As a result, the method of the invention enables the operator to manage and control the network management system in an easy and convenient manner.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for high-speed registration of a plurality of network elements (NE's) in a network management system, comprising the steps of:

selecting a NE registration case requiring a largest quantity of labor from among said plurality of network elements as an example set (ES);

inputting parameters to create a profile for said ES, said profile comprising information about a rack, shelf, unit, and port, corresponding to the port for which the ES is setup;

transmitting the profile of the ES from an element management system (EMS) to the NE used to create said ES;

reading the profile and analyzing the profile of the ES by the NE;

setting up all ports, units, shelves, and racks for each of said plurality of NE's;

transmitting a trap signal from the NE used to create said example set to the EMS; and analyzing set up information generated in the setting up of all ports, units, shelves and racks by the EMS.

2. A method for registration of a plurality of subscribers located at corresponding ones of a plurality of network elements (NEs) in a network management system, the method comprising the steps of:

activating a subscriber set-up and reference screen;

referring to a current set up state for setting up the plurality of subscribers;

inputting an ID for a V5 interface;

setting up registration of one of said plurality of subscribers by selecting an example set (ES) of parameters for registering said subscriber;

inputting parameters to create said ES;

providing an EMS a subscriber ID that corresponds to said subscriber when the ES was created when the current set up state for setting up the plurality of subscribers shows no problem;

making a profile comprising a location information for the subscriber used to create said ES;

transmitting the profile created from the element management system (EMS) to the NE using file transfer protocol (FTP) corresponding to said selected subscriber;

reading said profile and analyzing location information by said NE;

completing set up of all ports, units, shelves and racks necessary in said selected subscriber's connection;

transmitting a set-up completion trap from the NE to the EMS; and analyzing set up information generated by said NE in said completing set up step by said EMS.

3. The method of claim 2, said location information comprises rack, shelf, unit and port information for each of said plurality of subscribers.

4. A method for registering a plurality of network elements (NE's) in a network management system (NMS), comprising the steps of:

activating a set up and reference screen illustrating a current set up state;

selecting a subscriber corresponding to one of said plurality of NE's;

inputting an identification of said selected subscriber;

setting up an example set (ES) for said selected subscriber;

inputting parameters to create a profile to set up said selected subscriber, said profile comprising location information of said selected subscriber;

transmitting said profile from an element management system (EMS) to said NE corresponding to said selected subscriber;

reading and analyzing said profile by said NE;

setting up each of said plurality of NE's based on said profile and said ES;

transmitting a trap signal from said NE to said NMS; and analyzing set up information generated by said NE by said NMS.

5. The method of claim 4, said location information comprises port, shelf, unit and rack information.

6. The method of claim 4, said selected subscriber corresponds to a NE that requires the most complex programming for set up.

7. The method of claim 4, said selected subscriber is selected by said EMS.

8. The method of claim 6, said selected subscriber is selected by said EMS.

9. The method of claim 4, said selected subscriber is selected for similarity of set up with others of said plurality of subscribers.

10. The method of claim 9, said ES is amended prior to setting up remaining ones of said plurality of subscribers.

* * * * *